US012340169B2

(12) United States Patent
Sitkowski et al.

(10) Patent No.: US 12,340,169 B2
(45) Date of Patent: Jun. 24, 2025

(54) ELECTRONIC DOCUMENT GENERATION SYSTEMS AND METHODS

(71) Applicant: THE BANK OF NEW YORK MELLON, New York, NY (US)

(72) Inventors: Rafal Sitkowski, Watchung, NJ (US); Jeffrey Hassan, South Orange, NJ (US); Liza Antignani, Staten Island, NY (US); Erazm Edward Malarczyk, Wroclaw (PL); Marcin Maciej Makowski, Torun (PL); Boguslaw Fraszko, Legnica (PL)

(73) Assignee: The Bank of New York Mellon, New York, NY (US)

( * ) Notice: Subject to any disclaimer, the term of this patent is extended or adjusted under 35 U.S.C. 154(b) by 162 days.

(21) Appl. No.: 18/446,749

(22) Filed: Aug. 9, 2023

(65) Prior Publication Data
US 2025/0053733 A1 Feb. 13, 2025

(51) Int. Cl.
G06F 3/048 (2013.01)
G06F 3/0482 (2013.01)
G06F 40/186 (2020.01)

(52) U.S. Cl.
CPC .......... G06F 40/186 (2020.01); G06F 3/0482 (2013.01)

(58) Field of Classification Search
CPC .............................. G06F 40/186; G06F 3/048
See application file for complete search history.

(56) References Cited

U.S. PATENT DOCUMENTS

| 5,978,784 | A | 11/1999 | Fagg, III et al. |
| 7,168,035 | B1 * | 1/2007 | Bell ...................... G06F 40/143 |
| | | | 715/745 |
| 7,703,010 | B2 | 4/2010 | Bernstein et al. |

(Continued)

FOREIGN PATENT DOCUMENTS

| CN | 113822037 A | 12/2021 |
| WO | 2021/183943 | 9/2021 |

OTHER PUBLICATIONS

Conditional statement logic for placeholders (https://i.bdphq.com/conditional-statement-logic-for-placeholders/) accessed Mar. 15, 2023.

*Primary Examiner* — Linh K Pham
(74) *Attorney, Agent, or Firm* — Dinsmore & Shohl LLP (57) ABSTRACT

Electronic document generation systems and methods include a processor, a memory component communicatively coupled to the processor, and machine-readable instructions. The machine-readable instructions cause the system to access an electronic document generation template including placeholders with nesting values indicative of a number populating conditions to generate an electronic document, populate one or more placeholders associated with corresponding nesting values of zero with data from a master data store or data that is based on a user input to a prompt, prompt, via a graphical user interface, the user to respond to one or more conditional prompts, populate one or more placeholders associated with the next lowest corresponding nesting value based on a user input to the one or more conditional prompts, and generate the electronic document based on the one or more placeholders as populated via the electronic document generation template for display on the graphical user interface.

20 Claims, 5 Drawing Sheets

(56) References Cited

U.S. PATENT DOCUMENTS

| | | | | |
|---|---|---|---|---|
| 8,239,754 | B1* | 8/2012 | Orthlieb | G06F 40/169 |
| | | | | 715/232 |
| 10,007,654 | B2* | 6/2018 | Wilczek | G06F 40/174 |
| 10,970,477 | B1* | 4/2021 | Mohapatra | G06F 40/174 |
| 11,204,690 | B1* | 12/2021 | Hoberman | G06F 3/04842 |
| 11,615,236 | B1* | 3/2023 | Sharma | G06F 40/174 |
| | | | | 715/222 |
| 2004/0078337 | A1* | 4/2004 | King | G06F 21/64 |
| | | | | 705/51 |
| 2010/0251092 | A1* | 9/2010 | Sun | G06F 40/174 |
| | | | | 715/221 |
| 2012/0110440 | A1 | 5/2012 | Rosner et al. | |
| 2015/0199346 | A1 | 7/2015 | Wieczorek et al. | |
| 2018/0024978 | A1* | 1/2018 | Watanabe | G06F 40/143 |
| | | | | 715/224 |
| 2019/0042554 | A1* | 2/2019 | Aylett | G06F 40/186 |
| 2020/0380202 | A1* | 12/2020 | Cass | G06F 40/174 |
| 2022/0004704 | A1* | 1/2022 | Michaelson | G06N 5/04 |
| 2022/0012406 | A1* | 1/2022 | D'Oria | G06V 30/10 |
| 2022/0253596 | A1* | 8/2022 | Park | G06F 40/35 |
| 2022/0318494 | A1* | 10/2022 | Park | G06F 40/186 |
| 2023/0393717 | A1* | 12/2023 | Soli | G06F 3/0233 |
| 2024/0311522 | A1* | 9/2024 | Brady | G06F 30/13 |

* cited by examiner

ELECTRONIC DOCUMENT GENERATION SYSTEMS AND METHODS

TECHNICAL FIELD

The present specification generally relates to electronic document generation systems, and more particularly, to systems and methods for generating electronic documents based on a template including placeholders with corresponding nesting values indicative of a number of conditions to populate the placeholders.

BACKGROUND

With an increasing use of electronic documents in various domains, a growing need exists for efficient document generation. While document generation systems may allow participants to generate a document to populate in a static template, a need exists for an electronic document generation system that provides an efficient and user-friendly way to generate an electronic document based on a dynamic template.

SUMMARY

According to the subject matter of the present disclosure, an electronic document generation system may include a processor, a memory component communicatively coupled to the processor, and one or more machine-readable instructions that may be stored in the memory component that may cause the electronic document generation system to access an electronic document generation template to generate an electronic document via a graphical user interface. The electronic document generation template may include one or more placeholders associated with respective corresponding nesting values. Each respective corresponding nesting value may be indicative of a number of conditions required to populate the respective placeholder. The machine-readable instructions may also cause the electronic document generation system to populate the one or more placeholders associated with corresponding nesting values of zero with data from a master data store or data that is based on a user input to a prompt for the one or more placeholders associated with corresponding nesting values of zero, prompt, via the graphical user interface, the user to respond to one or more conditional prompts for the one or more placeholders associated with a next lowest corresponding nesting value, and populate the respective placeholder associated with the next lowest corresponding nesting value based on a user input to the one or more conditional prompts until all of the one or more placeholders associated with the next lowest corresponding nesting value are populated. The machine-readable instructions may further cause the electronic document generation system to generate the electronic document based on the one or more placeholders as populated via the electronic document generation template for display on the graphical user interface.

According to another embodiment of the present disclosure, a computer-implemented method for generating an electronic document may include accessing an electronic document generation template to generate an electronic document via a graphical user interface. The electronic document generation template may include one or more placeholders associated with respective corresponding nesting values and each respective corresponding nesting value may be indicative of a number of conditions required to populate the respective placeholder, the method may further include populating the one or more placeholders associated with corresponding nesting values of zero with data from a master data store or data that is based on a user input to a prompt for the one or more placeholders associated with corresponding nesting values of zero, prompting, via the graphical user interface, the user to respond to one or more conditional prompts for the one or more placeholders associated with a next lowest corresponding nesting value, and populating the one or more placeholders associated with the next lowest corresponding nesting value based on a user input to the one or more conditional prompts until all of the one or more placeholders associated with the next lowest corresponding nesting value are populated. The method may also include generating the electronic document based on the one or more placeholders as populated via the electronic document generation template for display on the graphical user interface.

According to yet another embodiment of the present disclosure, a computer-implemented method for generating an electronic document may include accessing an electronic document generation template to generate an electronic document via a graphical user interface. The electronic document generation template may include one or more placeholders associated with respective corresponding nesting values and each respective corresponding nesting value may be indicative of a number of conditions required to populate the respective placeholder. The method may also include populating the one or more placeholders associated with corresponding nesting values of zero with data from a master data store or data that is based on a user input to a prompt for the one or more placeholders associated with corresponding nesting values of zero, prompting the user to select a collaboration group via the graphical user interface; the collaboration group may include one or more roles assigned to each user within the collaboration group such that the user is assigned a role of the one or more roles. The method may further include displaying a predicted number of prompts remaining via the graphical user interface based on the one or more placeholders with a highest nesting value and the user input, prompting, via the graphical user interface, the user to respond to one or more conditional prompts for the one or more placeholders associated with a next lowest corresponding nesting value, wherein the prompt or a conditional prompt of the one or more conditional prompts may be based on the role assigned to the user within the collaboration group, displaying an update to the predicted number of prompts remaining via the graphical user interface based on the one or more placeholders with the highest nesting value and the user input, populating the one or more placeholders associated with the next lowest corresponding nesting value based on a user input to the one or more conditional prompts until all of the one or more placeholders associated with the next lowest corresponding nesting value are populated, and generating the electronic document based on the one or more placeholders as populated via the electronic document generation template for display on the graphical user interface.

The additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals in which:

DETAILED DESCRIPTION

In various embodiments described herein, electronic document generation systems and methods include accessing an electronic document generation template that has placeholders with corresponding nesting values. Each respective corresponding nesting value is indicative of a number of conditions required to populate the respective placeholder. The placeholders with a corresponding nesting values of zero may be populated based on data from a master data store or responses from a user. A user may be prompted to provide responses to populate the placeholders via a graphical user interface. The user may be prompted to provide responses until all of the placeholders with corresponding nesting values are populated. Based on the populated placeholders, an electronic document is generated for display on the graphical user interface.

As provided herein, the term "entity" may be used to refer to various organizations, departments, teams, groups, or similar entities within a business, governmental, or other similar organization. Accordingly, for purposes of the present disclosure, it should be understood that the term "entity" may encompass any number of separate groups capable of collaborating on an electronic document.

Embodiments of the present disclosure are thus directed to electronic document generation systems and computer-implemented methods of efficiently generating on an electronic document, as will now be described in more detail herein with reference to the drawings and where like numbers refer to like structures.

Figure 1:
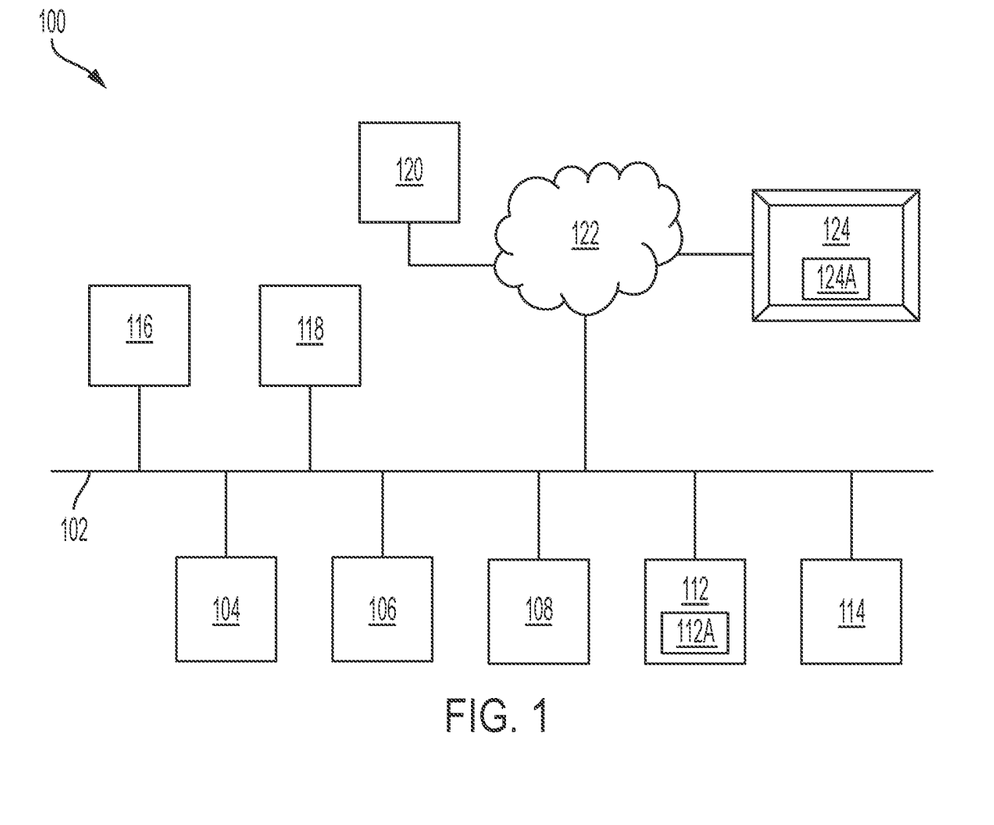
FIG. 1 schematically depicts an electronic document generation system, according to one or more embodiments shown and described herein.

Referring now to FIG. 1, an embodiment of an electronic document generation system 100 as described herein includes a communication path 102, one or more processors 104, a memory component 106, an artificial intelligence model 108, an electronic document generation template 112, a placeholders sub-module 112A of the electronic document generation template 112, a master data store 114, a document access module 116, a network interface hardware 118, a server 120, a network 122, and a device 124 with a graphical user interface 124A, such as a computing device 124. The various components of the electronic document generation system 100 and the interaction thereof will be described in detail below.

While only one server 120 and one device 124 is illustrated in FIG. 1, the electronic document generation system 100 can comprise multiple servers containing one or more applications and/or computing devices. In some embodiments, the electronic document generation system 100 is implemented using a wide area network (WAN) or network 122, such as an intranet or the internet. The device 124 may include digital systems and other devices permitting connection to and navigation of the network 122. It is contemplated and within the scope of this disclosure that the device 124 may be a personal computer, a laptop device, a smart mobile device such as a smart phone or smart pad, or the like. In embodiments, the device 124 may be any device with or without the graphical user interface 124A. Other electronic document generation system 100 variations allowing for communication between various geographically diverse components are possible. The lines depicted in FIG. 1 indicate communication rather than physical connections between the various components.

The electronic document generation system 100 includes the communication path 102. The communication path 102 may be formed from any medium that is capable of transmitting a signal such as, for example, conductive wires, conductive traces, optical waveguides, or the like, or from a combination of mediums capable of transmitting signals. The communication path 102 communicatively couples the various components of the electronic document generation system 100. As used herein, the term "communicatively coupled" means that coupled components are capable of exchanging data signals with one another such as, for example, electrical signals via conductive medium, electromagnetic signals via air, optical signals via optical waveguides, and the like.

The electronic document generation system 100 of FIG. 1 also includes the one or more processors 104. Each processor 104 can be any device capable of executing machine-readable instructions. Accordingly, each processor 104 may be a controller, an integrated circuit, a microchip, a computer, or any other computing device. Each processor 104 is communicatively coupled to the other components of the electronic document generation system 100 by the communication path 102. Accordingly, the communication path 102 may communicatively couple any number of processors 104 with one another, and allow the modules coupled to the communication path 102 to operate in a distributed computing environment. Specifically, each of the modules can operate as a node that may send and/or receive data.

The illustrated electronic document generation system 100 may further include the memory component 106 which is coupled to the communication path 102 and communicatively coupled to a processor 104 of the one or more processors 104. The memory component 106 may be a non-transitory computer readable medium or non-transitory computer readable memory and may be configured as a nonvolatile computer readable medium. The memory component 106 may include RAM, ROM, flash memories, hard drives, or any device capable of storing machine-readable instructions such that the machine-readable instructions can be accessed and executed by the processor 104. The machine-readable instructions may include logic or algorithm(s) written in any programming language such as, for example, machine language that may be directly executed by the processor 104, or assembly language, object-oriented programming (OOP), scripting languages, microcode, etc., that may be compiled or assembled into machine-readable instructions and stored on the memory component 106. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, as noted above, the electronic document generation system 100 may include a display, such as the graphical user interface 124A, on a screen of the device 124 for providing visual output such as, for example, information, graphical reports, messages, or a combination thereof. The graphical user interface 124A on the screen of the device 124 is coupled to the communication path 102 and communicatively coupled to the processor 104. Accordingly, the communication path 102 communicatively couples the graphical user interface 124A to other modules of the electronic document generation system 100. The graphical user interface 124A can include any medium capable of transmitting an optical output such as, for example, a cathode ray tube, light emitting diodes, a liquid crystal display, a plasma display, or the like. Additionally, it is noted that the graphical user interface 124A or the device 124 can include at least one of the processor 104 and the memory component 106. While the electronic document generation system 100 is illustrated as a single, integrated system in FIG. 1, in other embodiments, the systems can be independent systems.

The electronic document generation system 100 may include the electronic document generation template 112 configured to at least generate an electronic document as described herein and in greater detail further below. The placeholders sub-module 112A of the electronic document generation template 112 may be configured to provide the one or more placeholders to be populated, such that the placeholders are associated with corresponding nesting values, as described in greater detail further below. The document access module 116 may be configured to provide the participant user and/or a collaborator group access to the electronic document generation template 112 as described herein and in greater detail further below.

An embodiment of the electronic document generation system 100 as described herein may include an artificial intelligence/machine learning model 108 to train and provide machine learning capabilities to a neural network to aid with automated prompt responses through suggestions as described herein. Data stored and manipulated in the electronic document generation system 100 as described herein may be utilized by the artificial intelligence model 108. This machine learning application may create models that can be applied by the electronic document generation system 100, to make it more efficient and intelligent in execution. As an example and not a limitation, the artificial intelligence model 108 may include components such as an artificial intelligence engine, Bayesian inference engine, and a decision-making engine, and may have an adaptive learning engine further comprising a deep neural network learning engine.

The artificial intelligence model, the electronic document generation template 112, the placeholders sub-module 112A, and the document access module 116 may be coupled to the communication path 102 and communicatively coupled to the processor 104. As will be described in further detail below, the processor 104 may process the input signals received from the system modules and/or extract information from such signals.

Data stored and manipulated in the electronic document generation system 100 as described herein is utilized by the document access module 116, which may be able to leverage a cloud computing-based network configuration such as the cloud. Thus, the document access module 116 may be configured to provide the document to entities and/or collaborator groups and/or users via a cloud network. The electronic document generation system 100 further includes the network interface hardware 118 for communicatively coupling the electronic document generation system 100 with a computer network such as network 122. The network interface hardware 118 may be coupled to the communication path 102 such that the communication path 102 communicatively couples the network interface hardware 118 to other modules of the electronic document generation system 100. The network interface hardware 118 can be any device capable of transmitting and/or receiving data via a wireless network. Accordingly, the network interface hardware 118 can include a communication transceiver for sending and/or receiving data according to any wireless communication standard. For example, the network interface hardware 118 can include a chipset (e.g., antenna, processors, machine-readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 1, data from various applications running on device 124 can be provided from the device 124 to the electronic document generation system 100 via the network interface hardware 118. The device 124 can be any device having hardware (e.g., chipsets, processors, memory, etc.) for communicatively coupling with the network interface hardware 118 and a network 122. Specifically, the device 124 can include an input device having an antenna for communicating over one or more of the wireless computer networks described above.

The network 122 can include any wired and/or wireless network such as, for example, wide area networks, metropolitan area networks, the internet, an intranet, satellite networks, or the like. Accordingly, the network 122 can be utilized as a wireless access point by the device 124 to access one or more servers (e.g., a server 120). The server 120 and any additional servers generally include processors, memory, and chipset for delivering resources via the network 122. Resources can include providing, for example, processing, storage, software, and information from the server 120 to the electronic document generation system 100 via the network 122. Additionally, it is noted that the server 120 and any additional servers can share resources with one another over the network 122 such as, for example, via the wired portion of the network, the wireless portion of the network, or combinations thereof. Where used herein, "a first element, a second element, or combinations thereof" reference an "and/or" combination similar to use herein of "at least one of a first element or a second element."

The machine-readable instructions stored on the memory component 106 may cause the electronic document generation system 100 to access the electronic document generation template 112 to generate an electronic document 206 (FIG. 2) via the graphical user interface 124A. The electronic document generation template 112 may include a template page layout, style, and/or information. A user may select the electronic document generation template 112 from a list of templates. The list of templates may include template contracts, emails, receipts, presentations, memorandums, purchase reports, or any other suitable templates.

Figure 2:
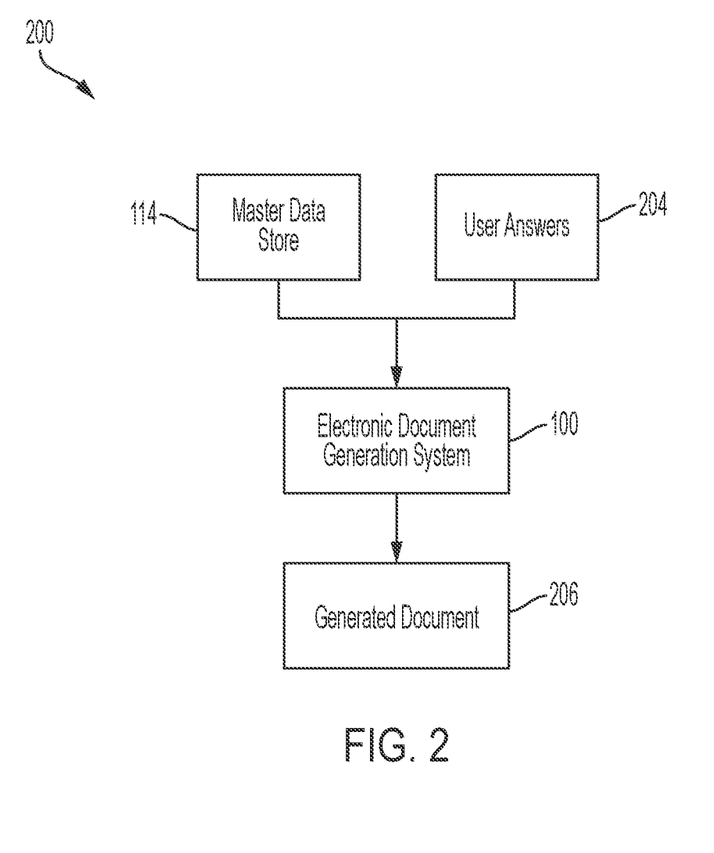
FIG. 2 schematically depicts a system diagram of the electronic document generation system of FIG. 1, according to one or more embodiments shown and described herein.

Referring to FIGS. 1 and 2, the electronic document generation template 112 may include one or more placeholders. The one or more placeholders may include blanks (e.g., blank entry fields) within the electronic document generation template 112 that require input from the master data store 114 and/or the user to populate the blanks. The input from the master data store 114 or the user may include names, dates, addresses, locations, or any other information that may be specific to a particular electronic document generation template 112. The one or more placeholders may be associated with a corresponding nesting value. Each respective corresponding nesting value may be indicative of a number of conditions required in order to populate the respective placeholder. For example, a first placeholder with a corresponding nesting value of 1 may require one condition to be met before the first placeholder is populated. On the other hand, a second placeholder with a corresponding nesting value of 3 may require three conditions to be met before the second placeholder is populated. The conditions may be met, according to an embodiment, through user responses 204 input in response to questions prompted to the user through the graphical user interface 124A, as explained further below.

In various embodiments, the one or more placeholders associated with corresponding nesting values of 0 may be populated with data from the master data store 114 or based on the user responses 204 in response to the prompt for the one or more placeholders with a value of 0, such that the response to the prompt does not result in a follow-up prompt. Thus, the one or more placeholders associated with corresponding nesting values of 0 may not be based on and do not require conditions to be met before being completely populated.

On the other hand, one or more placeholders associated with corresponding nesting values of one (1) or more may require responses from a user to a corresponding respective one or more conditional prompts. In embodiments, the one or more conditional prompts may be in the form of a question, command, instruction, or the like. The user response to the one or more conditional prompts may be used to populate the respective placeholder associated with nesting values other of 1 or more. The user may be prompted to respond to one or more conditional prompts remaining when one or more placeholders have not been populated after a first round of the user responding to the one or more conditional prompts. In embodiments, the response by the user to the one or more conditional prompts may be in the form of a user input such as an answer, entry, or the like.

Referring now to FIG. 2, a system diagram 200 of the electronic document generation system 100 of FIG. 1 is depicted according to an embodiment. As discussed hereinabove, the electronic document generation system 100 may utilize information from the master data store 114 and/or user responses 204 (either to a prompt with a corresponding nesting value of zero (0) or a conditional prompt with a corresponding nesting value of one (1) or more) as inputs. Although the master data store 114 and user responses 204 are depicted as inputs in the system diagram 200, other inputs, such as those from the artificial intelligence model 108, may be utilized as inputs into the electronic document generation system 100.

The user responses 204 may be responses input by the user through the graphical user interface 124A of display of computing device 124. The user responses 204 may include a user response input in response to one or more prompts as prompted to the user via the graphical user interface 124A associated with one or more placeholders with corresponding nesting values of zero, one, or more, embodiments of which are shown in and discussed further below with respect to FIG. 4 and FIG. 5. Based on the input from the master data store 114 and the user responses 204, the electronic document generation system 100 generates an electronic document 206 based on the one or more placeholders.

Figure 3:
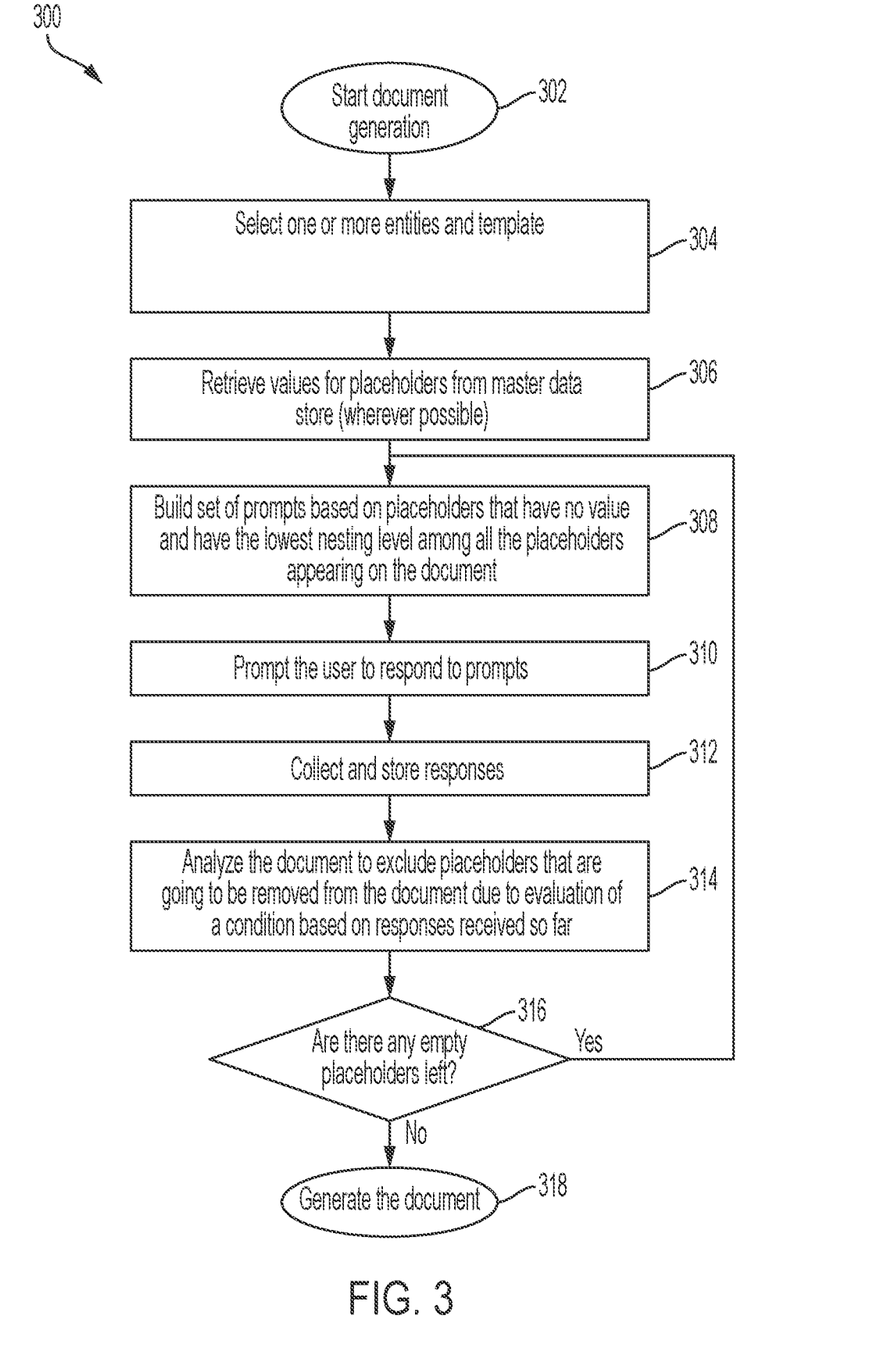
FIG. 3 schematically depicts an illustrative flowchart of a computer-implemented method for generating on an electronic document utilizing the electronic document generation system of FIG. 1, according to one or more embodiments shown and described herein.

Referring to FIG. 3, an example process 300 of a computer-implemented method for generating an electronic document 206 using the electronic document generation system 100 of FIG. 1 is depicted. The machine-readable instructions stored on the memory component 106 coupled to the processor 104 may cause the electronic document generation system 100 to perform a logic scheme when executed by the processor 104. For example, the machine-readable instructions may cause the electronic document generation system 100 to perform as the logic scheme at least the features described below with respect to block 302 through block 318. In block 302, document generation is started and, in block 304, a user selects one or more entities, and an electronic document generation template 112, as shown in fields 400 via the graphical user interface 124A in FIG. 4. Nesting levels of placeholders are already calculated and stored on and associated with the electronic document generation template 112 per a processing triggered by an upload of the electronic document generation template 112.

Figure 4:
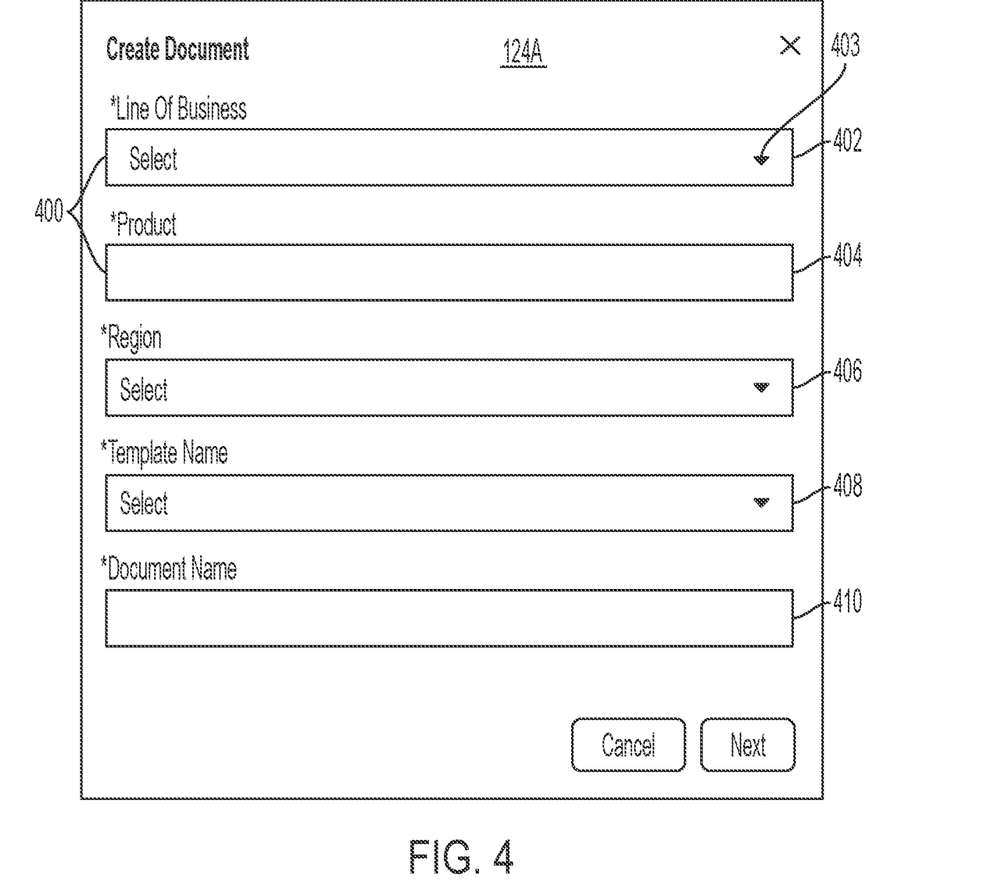
FIG. 4 schematically depicts an exemplary user interface of the electronic document generation system of FIG. 1 for responding to a prompt, according to one or more embodiments shown and described herein.

For example, and as depicted in FIG. 4, a user may enter a line of business in a line of business field 402, which may be entered manually or via a drop-down menu 403, a product in the product field 404, a region in the region field 406, a template name in the template name box 408, and/or a document name in the document name field 410. In embodiments, the user may manually enter any value/entry into the fields 400. In other embodiments, the fields 400 may include a drop-down menu 403 such that the user may select an entry from a list of template entries. There may be one or more entries in the list of template entries. One of the entries in the list of template entries may include an "other" entry. When the user selects "other," the user may be prompted to further enter a value or other text rather than selecting from the list of template entries. In some embodiments, electronic document generation system 100 may detect a user location through a global positioning system (GPS). As such, the region field 406 may be automatically populated by the electronic document generation template 112 based on a detected user location and/or based on a user profile storing location information in the master data store 114. Thus, in embodiments, one or more prompts to generate the electronic document 206 may be automatically responded to by the electronic document generation template 112 based on a detected user location, wherein the one or more prompts include a prompt having a nesting value of zero and/or one or more conditional prompts having nesting values of one or more, as described herein and in greater detail below. Thus, the one or more prompts include at least one of (i) a prompt having a nesting value of zero or (ii) one or more conditional prompts having nesting values of one or more. As described herein, use of terminology indicating at least one of A or B is representative of an "A and/or B" combination.

Referring again to FIG. 3, based on the entries in the fields 400, the electronic document generation template 112 is selected and accessed in block 304. The electronic document generation template 112 is accessed via the graphical user interface 124A to generate the electronic document 206. The electronic document generation template 112 may include one or more placeholders associated with respective corresponding nesting values. Each respective corresponding nesting values is indicative of a number of conditions required to populate the respective placeholder. The nesting values may be assigned to each of the one or more placeholders in the respective electronic document generation template. Moreover, the nesting values may be determined for each of the one or more placeholders based on the entries of the fields 400.

The one or more placeholders may have a corresponding nesting value of zero or more depending on the number of conditions required to populate the respective placeholder. For example, a placeholder may be associated with a corresponding nesting value of zero (0) when no conditions are required to populate the placeholder. On the other hand, a placeholder may be associated with a corresponding nesting value of two (2) when two conditions are required to populate the placeholder. A complex and comprehensive electronic document may have one or more placeholders with high corresponding nesting values, meaning the user may have to respond to several prompts to completely populate the one or more placeholders. On the other hand, a simple electronic document may have one or more placeholders with low corresponding nesting values, meaning the user may only have to provide one or two responses to populate the corresponding one or more placeholders. The one or more placeholders associated with corresponding nesting values of zero may be populated with data from a master data store 114 (block 306) or based on a user response to a prompt for the one or more placeholders associated with corresponding nesting values of zero (blocks 310-312), as described in greater detail below.

In block 306, one or more values as responses may be retrieved from the master data store 114 to populate some of the one or more placeholders with corresponding nesting values of zero (i.e., nesting values with no conditions required to populate the one or more placeholders). Values from the master data store 114 may populate none, some, or all of the one or more placeholders with corresponding nesting values of zero. The master data store 114 may contain data such as a client address, number of employees, date of incorporation, or any other relevant data that may be helpful to populate the respective placeholder. In some embodiments, the master data store 114 may be an internal or external data source. For example, the master data store 114 may be the internal memory component within the electronic document generation system 100, while in other embodiments the master data store 114 may be an external data source, such as an online database communicatively coupled to the electronic document generation system 100.

In block 308, when some or all of the one or more placeholders with corresponding nesting values of zero are not automatically populated through values retrieved from the master data store 114, the electronic document generation system 100 may build a set of prompts based on the one or more placeholders with corresponding nesting values of zero that have not been automatically populated from the master data store 114 or corresponding lowest nesting values among all the placeholder appearing on the electronic document 206. As such, the one or more placeholders with corresponding nesting values of zero may also be populated based on a response to a prompt including the one or more placeholders associated with corresponding nesting values of zero. The one or more placeholders with corresponding nesting values of zero are not based on a condition, but simply require user input when a required entry could not be automatically retrieved from the master data store 114, such as when the required entry does not exist and/or is not stored in the master data store 114.

In embodiments, data may be added to the master data store 114 based on the user input to the prompt for the one or more placeholders associated with corresponding nesting values of zero. Data may also be added to the master data store through the artificial intelligence model 108. As such, the artificial intelligence model 108 may automatically populate the one or more placeholders with corresponding nesting values of zero in future electronic document generation. In other embodiments, the artificial intelligence model 108 may be trained to identify one or more suggestions to respond to one or more prompts used to populate the respective placeholder. The one or more prompts may include the prompt and/or the one or more conditional prompts, as described herein. The user may be prompted with a suggestion to respond to the one or more prompts via the graphical user interface 124A based on the one or more suggestions identified by the artificial intelligence model 108. The artificial intelligence model 108 may display a suggestion to the user on the graphical user interface 124A. The user may select to populate the fields 400 with the suggested response from the artificial intelligence model 108 or the user may enter a value or response different from the suggested response from the artificial intelligence model 108. When the user enters a value or response different from the suggested response from the artificial intelligence model 108, the artificial intelligence model 108 may suggest a different response in future suggestions, or suggest multiple different responses in future suggestions. The suggested responses from the artificial intelligence model 108 may be in the form of a prompt below the fields 400. In other embodiments, the suggested responses from the artificial intelligence model 108 may be presented by and selected via the drop-down menu 403 in the fields 400.

In block 310, a user may be prompted via the graphical user interface 124A to respond to one or more conditional prompts for the one or more placeholders associated with a next lowest corresponding nesting value. In embodiments, the electronic document generation system 100 may prompt the user with a set of prompts from block 308. The prompt may be displayed to the user, and the user may be prompted to respond to the prompt through the graphical user interface 124A. The user may be prompted to respond to one prompt at a time, or the user may be prompted to respond to the set of prompts at once. In some embodiments, the electronic document generation system 100 may include a speaker and a microphone; as such, the prompt may be asked to the user through the speaker and the user may respond to the prompt through the microphone, which response may be automatically transcribed and entered into the corresponding placeholder of the electronic document generation template 112.

In block 312, the one or more placeholders associated with the next lowest corresponding nesting value may be populated based on a user input to the one or more conditional prompts until all of the one or more placeholders associated with the next lowest corresponding nesting value are populated as determined via blocks 314-316 described below. In embodiments, in block 312, the electronic document generation system 100 is configured to collect and store the responses that the user provides in response to the prompts. In block 314 the electronic document generation system 100 is further configured to analyze the document being generated via the electronic document generation template 112 to exclude one or more placeholders that are going to be removed from the document due to evaluation of a condition based on the responses received so far. Thus, some conditions may no longer be applicable/required based on the user responses. As a non-limiting example, a first placeholder may have a nesting value of one. However, based on the user responses to the prompts collected in block 312, the first placeholder nesting value may change to zero such that a condition based response to a conditional prompt is no longer required.

In certain embodiments, the electronic document 206 to be generated may be a contract. A particular deadline may only be applicable when the contract is being executed in certain regions, such as Belgium by way of example. Thus, the fields may include a first prompt 422 that asks for the country name to be selected from the drop-down menu 403 in a first prompt field 400A (depicted in FIG. 5 and discussed further below). When a country associated with a condition is selected, such as Belgium, the user may be asked a second prompt such as an associated deadline to confirm an associated deadline condition will be met. However, the user may selects a country not associated with a condition, such as Germany in an example, as the country. In such an instance, the deadline condition associated with the country designation placeholder may be removed from the electronic document because the condition is no longer relevant. On the other hand, if the user selects a country associated with the condition such as Belgium, the user is then asked for the particular deadline in the next round of prompts through the graphical user interface 124A to satisfy the condition.

In block 316, the electronic document generation system 100 evaluates whether there are any empty placeholders left of the one or more placeholders. Empty placeholders will exist if the placeholders were not populated in block 312 and/or excluded in block 314. If there are no empty placeholders left, then the electronic document 206 is generated in block 318 based on the one or more placeholders as populated via the electronic document generation template 112, and the electronic document 206 as generated and with all relevant placeholders populated in is displayed on the graphical user interface 124A. On the other hand, if there are empty placeholders left, the electronic document generation system 100 returns to block 308 and a new set of prompts is built based on any remaining placeholders that have the lowest nesting value among the one or more placeholders remaining in the document. Blocks 308 through 316 are iteratively executed until there are no empty placeholders left such that the completed electronic document 206 may be generated for display in block 318. Thus, in block 318, the electronic document 206 is generated based on the one or more placeholders as populated via the electronic document generation template 112 for display on the graphical user interface 124A.

Figure 5:
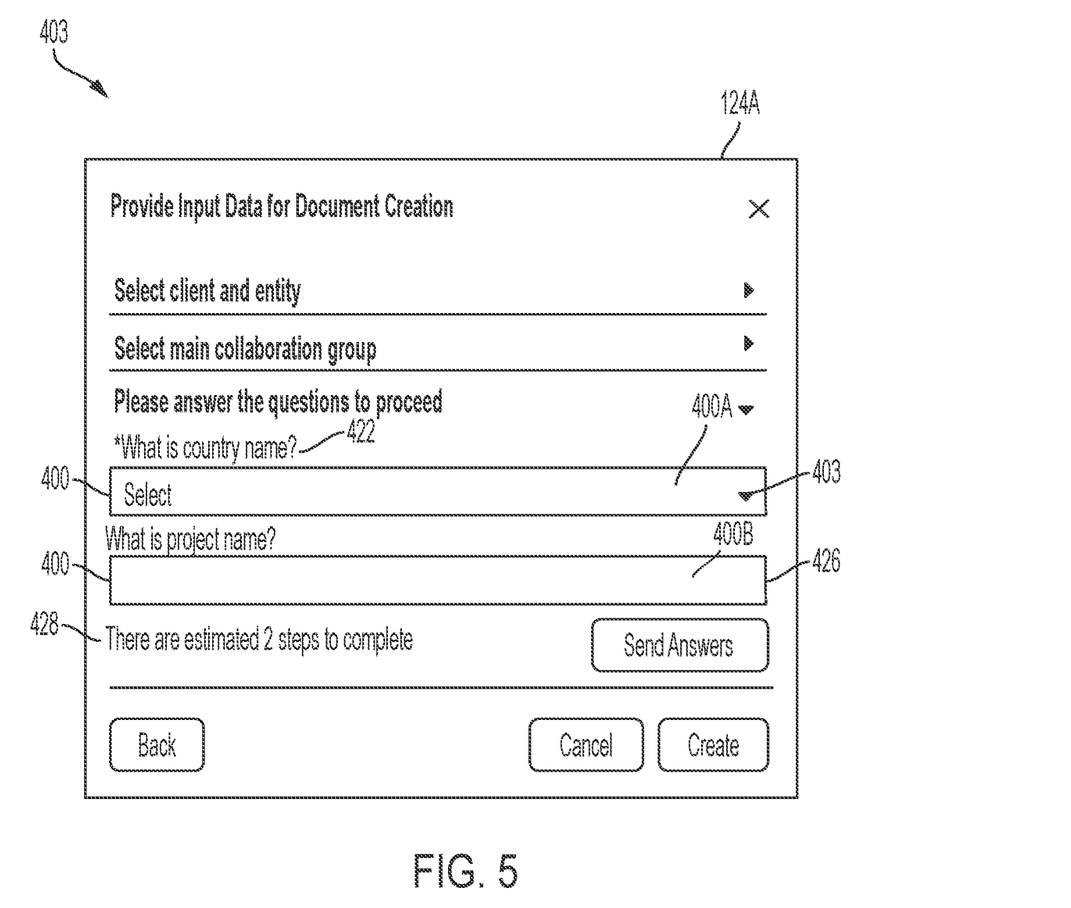
FIG. 5 schematically depicts an exemplary user interface of the electronic document generation system of FIG. 1 for responding to one or more conditional prompts, according to one or more embodiments shown and described herein.

As described above, the generated electronic document 206 may be generated based on responses to one or more conditional prompts. Referring to FIG. 5, an embodiment of the set of one or more conditional prompts generated in block 308 is displayed on the graphical user interface 124A. The one or more conditional prompts may include the first prompt 422 that asks for the country name to be selected from the drop-down menu 403 in a first prompt field 400A and a second prompt 400B that asks for the project name to be entered into or selected from a project name field 426. In an embodiment, the project name may be, for example, a fund name. The one or more conditional prompts may dynamically change depending on the responses explained hereinabove or the electronic document generation template 112 uploaded.

As depicted in FIG. 5, the electronic document generation system 100 may also display a predicted number of prompts remaining 428 via the graphical user interface 124A based on the one or more placeholders with a highest nesting value and the user input. However, the predicted number of prompts remaining 428 may change and be updated because the one or more placeholders with a highest nesting value may be removed from the document based on responses received from the user and evaluations of associated conditions thus far. Thus, in embodiments, an update to the predicted number of prompts remaining may be displayed via the graphical user interface 124A based on the one or more placeholders with the highest nesting value and the user response input.

The artificial intelligence model 108 may process previous iterations of an electronic document 206 being generated from a particular electronic document generation template. Therefore, the predicted number of prompts remaining 428 may be based on an average number of prompts remaining as identified by the artificial intelligence model 108. Moreover, the artificial intelligence model 108 may recognize the average number of prompts asked on a particular electronic document generation template 112 based on where the detected user location; as such, the predicted number of prompts remaining 426 may be predicted by the artificial intelligence model 108 based on the detected user location. In embodiments, the predicted number of prompts remaining may be displayed via the graphical user interface 124A based on the average number of remaining prompts identified by the artificial intelligence model 108.

Referring again to FIG. 5, the graphical user interface 124A may also display an entity and/or group selection or entry, such as a client and entity entry and a collaboration group entry. As such, the user may be prompted to select or enter a collaboration group via the graphical user interface 124A. The collaboration group may include one or more roles assigned to each user within the collaboration group such that the user is assigned a role of the one or more roles. The user may be prompted to answer a role question as the prompt via the graphical user interface 124A based on the role assigned to the user within the collaboration group, as will be described in greater detail further below.

The user and other users may be a participant user of the collaboration group, and the collaboration group may be one of one or more collaboration groups connected to the network 122 of the electronic document generation system 100. Each of the one or more collaboration groups may include one or more participant users. Furthermore, each of the one or more collaboration groups may be assigned to an entity and/or client. In some embodiments, the user may be prompted with a recommended collaboration group via the graphical user interface 124A based on the one or more suggestions identified by the artificial intelligence model 108. The recommended collaboration group may be identified by the artificial intelligence model 108 based on previous collaboration groups that the user has been a part of, previous collaboration groups that have worked on a similar electronic document generation template 112, or both.

When the user selects one or more collaboration groups, the electronic document generation template 112 may be shared with the one or more participant users included in the one or more collaboration groups. As such, the one or more participant users included in the one or more collaboration groups may edit, add, and delete contents based on the electronic document generation template 112 to change the electronic document 206 or in the electronic document generation template 112. The one or more participant users may be notified in embodiments that a new electronic document generation template 112 has been added to the collaboration group. The one or more participant users may be notified through email, text message, or any other suitable notification.

The user may also be prompted to respond to one or more role questions as the prompt via the graphical user interface 124A based on a role assigned to the participant user within the collaboration group. The participant user may not be required to respond to all of the prompts or conditional prompts. Some participant users may respond to some of the prompts or conditional prompts, while other participant users respond to the remaining prompts or conditional prompts based on the role assigned to the participant users. The electronic document generation system 100 may track changes that participant users have made to the electronic document generation template 112. Participant users may accept or reject changes that other participant users have made to the electronic document generation template 112. In some embodiments the artificial intelligence model 108 automatically assigns the participant user a role in the collaboration group based on previous roles the participant user has been assigned in similar electronic document generation templates 112.

In embodiments, the user may have a role of supervisor, creator, coordinator, manager, or any other suitable role. The user may enter the role from one or more roles when asked the role question or select the role from the drop-down menu 403. In some embodiments, the user may be restricted from editing, adding, or deleting certain contents in the electronic document generation template 112 based on the role the participant user is assigned and/or selects. In other embodiments, all participant users have access to edit, add, or delete all contents in the electronic document generation template 112. If the user has the role of supervisor, the user may have the ability to approve the electronic document 206 as generated. As such, the supervisor may be notified when the electronic document 206 based on the electronic document generation template 112 has been completed by other participant users. The participant users may mark the electronic document generation template 112 as complete. In other embodiments, the artificial intelligence model 108 may suggest that the electronic document generation template 112 is complete based on all of the one or more placeholders being populated. The artificial intelligence model 108 may also automatically mark the electronic document generation template 112 as complete. The supervisor on the electronic document generation template 112 may be assigned by the user. In some embodiments, the supervisor may be suggested by the artificial intelligence model 108 based on the one or more suggestions identified by the artificial intelligence model 108.

In embodiments, the electronic document generation system 100 and methods as described herein assist to significantly ease electronic document generation with respect to electronic document generation templates 112. The present disclosure also assists to case collaboration between participant users collaborating on electronic document generation templates 112 to generate one or more associated electronic documents 206. As a non-limiting example, a user may be prompted to populate one or more placeholders within the electronic document generation templates 112 with a corresponding nesting value from lowest to highest values until all relevant placeholders based on the submitted responses have been populated. Thus, in response to the user responses, the electronic document generation system 100 may populate one or more placeholders, exclude other placeholders, and determine whether one or more conditional prompts need to be displayed as prompts to the user to respond to or whether the electronic document 206 can be generated. As a result, the electronic document generation system 100 quickly populates or excludes the placeholders, rather than requiring the user to manually enter or exclude every placeholder. The electronic document generation system 100 may also recommend responses to the user, recommend collaboration groups, and/or recommend user roles to the user such as through the artificial intelligence model 108. Accordingly, it should be appreciated that the electronic document generation system 100 and methods described herein provides a quick and efficient way to generate electronic documents 206.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Aspects Listing:

Aspect 1. An electronic document generation system may include a processor, a memory component communicatively coupled to the processor, and one or more machine-readable instructions stored in the memory component. The one or more machine-readable instructions cause the electronic document generation system to perform at least the following when executed by the processor: access an electronic document generation template to generate an electronic document via a graphical user interface, wherein the electronic document generation template includes one or more placeholders associated with respective corresponding nesting values, wherein each respective corresponding nesting value is indicative of a number of conditions required to populate the respective placeholder; populate the one or more placeholders associated with corresponding nesting values of zero with data from a master data store or data that is based on a user input to a prompt for the one or more placeholders associated with corresponding nesting values of zero; prompt, via the graphical user interface, the user to respond to one or more conditional prompts for the one or more placeholders associated with a next lowest corresponding nesting value; populate the respective placeholder associated with the next lowest corresponding nesting value based on a user input to the one or more conditional prompts until all of the one or more placeholders associated with the next lowest corresponding nesting value are populated; and generate the electronic document based on the one or more placeholders as populated via the electronic document generation template for display on the graphical user interface.

Aspect 2. The electronic document generation system of Aspect 1, further including one or more machine-readable instructions that cause the electronic document generation system to perform at least the following when executed by the processor: prompt the user to select a collaboration group via the graphical user interface, wherein the collaboration group comprises one or more roles assigned to each user within the collaboration group such that the user is assigned a role of the one or more roles.

Aspect 3. The electronic document generation system of Aspect 2, further including one or more machine-readable instructions that cause the electronic document generation system to perform at least the following when executed by the processor: prompt the user to answer a role question as the prompt via the graphical user interface based on the role assigned to the user within the collaboration group.

Aspect 4. The electronic document generation system of any of Aspect 1 to Aspect 3, wherein the master data store comprises an internal or external data source.

Aspect 5. The electronic document generation system of any of Aspect 1 to Aspect 4, further including one or more machine-readable instructions that cause the electronic document generation system to perform at least the following when executed by the processor: display a predicted number of prompts remaining via the graphical user interface based on the one or more placeholders with a highest nesting value and the user input.

Aspect 6. The electronic document generation system of any of Aspect 1 to Aspect 5, wherein one or more prompts to generate the electronic document are automatically responded to by the electronic document generation template based on a detected user location, wherein the one or more prompts comprise at least one of (i) the prompt or (ii) the one or more conditional prompts.

Aspect 7. The electronic document generation system of any of Aspect 1 to Aspect 6, further including an artificial intelligence model implemented by the processor, wherein the artificial intelligence model is trained to identify one or more suggestions to respond to one or more prompts, wherein the one or more prompts comprise at least one of (i) the prompt or (ii) the one or more conditional prompts.

Aspect 8. The electronic document generation system of Aspect 7, further including one or more machine-readable instructions that cause the electronic document generation system to perform at least the following when executed by the processor: prompt the user with an auto-populate suggestion to respond to the one or more prompts via the graphical user interface based on the one or more suggestions identified by the artificial intelligence model.

Aspect 9. The electronic document generation system of Aspect 7 or Aspect 8, further including one or more machine-readable instructions that cause the electronic document generation system to perform at least the following when executed by the processor: prompt the user with a recommended collaboration group via the graphical user interface based on the one or more suggestions identified by the artificial intelligence model.

Aspect 10. The electronic document generation system of any of Aspect 7 to Aspect 9, further including one or more machine-readable instructions that cause the electronic document generation system to perform at least the following when executed by the processor: display a predicted number of prompts remaining via the graphical user interface based on an average number of remaining prompts identified by the artificial intelligence model.

Aspect 11. A computer-implemented method for generating an electronic document, the computer-implemented method including: accessing an electronic document generation template to generate an electronic document via a graphical user interface, wherein the electronic document generation template comprises one or more placeholders associated with respective corresponding nesting values, wherein each respective corresponding nesting value is indicative of a number of conditions required to populate the respective placeholder; populating the one or more placeholders associated with corresponding nesting values of zero with data from a master data store or data that is based on a user input to a prompt for the one or more placeholders associated with corresponding nesting values of zero; prompting, via the graphical user interface, the user to respond to one or more conditional prompts for the one or more placeholders associated with a next lowest corresponding nesting value; populating the one or more placeholders associated with the next lowest corresponding nesting value based on a user input to the one or more conditional prompts until all of the one or more placeholders associated with the next lowest corresponding nesting value are populated; and generating the electronic document based on the one or more placeholders as populated via the electronic document generation template for display on the graphical user interface.

Aspect 12. The computer-implemented method of Aspect 11, further including prompting the user to select a collaboration group via the graphical user interface, wherein the collaboration group comprises a role assigned to each user within the collaboration group.

Aspect 13. The computer-implemented method of Aspect 11 or Aspect 12, further including displaying a predicted number of prompts remaining via the graphical user interface based on the one or more placeholders with a highest nesting value and the user input.

Aspect 14. The computer-implemented method of any of Aspect 11 to Aspect 13, further including automatically responding one or more prompts to generate the electronic document based on a detected user location, wherein the one or more prompts comprise at least one of (i) the prompt or (ii) the one or more conditional prompts.

Aspect 15. The computer-implemented method of any of Aspect 11 to Aspect 14, further including identifying one or more suggestions to respond to one or more prompts through an artificial intelligence model, wherein the one or more prompts comprise at least one of (i) the prompt or (ii) the one or more conditional prompts.

Aspect 16. The computer-implemented method of Aspect 15, further including prompting the user with an auto-populate suggestion to respond to the one or more prompts via the graphical user interface based on the one or more suggestions identified by the artificial intelligence model.

Aspect 17. The computer-implemented method of Aspect 15 or Aspect 16, further including prompting the user with a recommended collaboration group via the graphical user interface based on the one or more suggestions identified by the artificial intelligence model.

Aspect 18. The computer-implemented method of any of Aspect 15 to Aspect 17, further including displaying a predicted number of prompts remaining via the graphical user interface based on an average number of remaining prompts identified by the artificial intelligence model.

Aspect 19. A computer-implemented method for generating an electronic document, the computer-implemented method includes: accessing an electronic document generation template to generate an electronic document via a graphical user interface, wherein the electronic document generation template comprises one or more placeholders associated with respective corresponding nesting values, wherein each respective corresponding nesting value is indicative of a number of conditions required to populate the respective placeholder; populating the one or more placeholders associated with corresponding nesting values of zero with data from a master data store or data that is based on a user input to a prompt for the one or more placeholders associated with corresponding nesting values of zero; prompting the user to select a collaboration group via the graphical user interface, wherein the collaboration group comprises one or more roles assigned to each user within the collaboration group such that the user is assigned a role of the one or more roles; displaying a predicted number of prompts remaining via the graphical user interface based on the one or more placeholders with a highest nesting value and the user input; prompting, via the graphical user interface, the user to respond to one or more conditional prompts for the one or more placeholders associated with a next lowest corresponding nesting value, wherein the prompt or a conditional prompt of the one or more conditional prompts may be based on the role assigned to the user within the collaboration group; displaying an update to the predicted number of prompts remaining via the graphical user interface based on the one or more placeholders with the highest nesting value and the user input; populating the one or more placeholders associated with the next lowest corresponding nesting value based on a user input to the one or more conditional prompts until all of the one or more placeholders associated with the next lowest corresponding nesting value are populated; and generating the electronic document based on the one or more placeholders as populated via the electronic document generation template for display on the graphical user interface.

Aspect 20. The computer-implemented method of Aspect 20, further including identifying one or more suggestions to respond to one or more prompts through an artificial intelligence model, wherein the one or more prompts comprise at least one of (i) the prompt or (ii) the one or more conditional prompts; and prompting the user with an auto-populate suggestion to respond to the one or more prompts via the graphical user interface based on the one or more suggestions identified by the artificial intelligence model.

What is claimed is:

1. An electronic document generation system comprising:
   a processor;
   a memory component communicatively coupled to the processor; and
   one or more machine-readable instructions stored in the memory component that cause the electronic document generation system to perform at least the following when executed by the processor:
   access an electronic document generation template to generate an electronic document via a graphical user interface, wherein the electronic document generation template comprises one or more placeholders associated with respective corresponding nesting values, wherein each respective corresponding nesting value is indicative of a number of conditions required to populate the respective placeholder;
   populate the one or more placeholders associated with corresponding nesting values of zero with data from a master data store or data that is based on a user input to a prompt for the one or more placeholders associated with corresponding nesting values of zero;
   prompt, via the graphical user interface, the user to respond to one or more conditional prompts for the one or more placeholders associated with a next lowest corresponding nesting value;
   populate the respective placeholder associated with the next lowest corresponding nesting value based on a user input to the one or more conditional prompts until all of the one or more placeholders associated with the next lowest corresponding nesting value are populated; and
   generate the electronic document based on the one or more placeholders as populated via the electronic document generation template for display on the graphical user interface.

2. The electronic document generation system of claim 1, further comprising one or more machine-readable instructions that cause the electronic document generation system to perform at least the following when executed by the processor:
   prompt the user to select a collaboration group via the graphical user interface, wherein the collaboration group comprises one or more roles assigned to each user within the collaboration group such that the user is assigned a role of the one or more roles.

3. The electronic document generation system of claim 2, further comprising one or more machine-readable instructions that cause the electronic document generation system to perform at least the following when executed by the processor:
   prompt the user to answer a role question as the prompt via the graphical user interface based on the role assigned to the user within the collaboration group.

4. The electronic document generation system of claim 1, wherein the master data store comprises an internal or external data source.

5. The electronic document generation system of claim 1, further comprising one or more machine-readable instructions that cause the electronic document generation system to perform at least the following when executed by the processor:
   display a predicted number of prompts remaining via the graphical user interface based on the one or more placeholders with a highest nesting value and the user input.

6. The electronic document generation system of claim 1, wherein one or more prompts to generate the electronic document are automatically responded to by the electronic document generation template based on a detected user location, wherein the one or more prompts comprise at least one of (i) the prompt or (ii) the one or more conditional prompts.

7. The electronic document generation system of claim 1, further comprising an artificial intelligence model implemented by the processor, wherein the artificial intelligence model is trained to identify one or more suggestions to respond to one or more prompts, wherein the one or more prompts comprise at least one of (i) the prompt or (ii) the one or more conditional prompts.

8. The electronic document generation system of claim 7, further comprising one or more machine-readable instructions that cause the electronic document generation system to perform at least the following when executed by the processor:

prompt the user with an auto-populate suggestion to respond to the one or more prompts via the graphical user interface based on the one or more suggestions identified by the artificial intelligence model.

9. The electronic document generation system of claim 7, further comprising one or more machine-readable instructions that cause the electronic document generation system to perform at least the following when executed by the processor:
prompt the user with a recommended collaboration group via the graphical user interface based on the one or more suggestions identified by the artificial intelligence model.

10. The electronic document generation system of claim 7, further comprising one or more machine-readable instructions that cause the electronic document generation system to perform at least the following when executed by the processor:
display a predicted number of prompts remaining via the graphical user interface based on an average number of remaining prompts identified by the artificial intelligence model.

11. A computer-implemented method for generating an electronic document, the computer-implemented method comprising:
accessing an electronic document generation template to generate an electronic document via a graphical user interface, wherein the electronic document generation template comprises one or more placeholders associated with respective corresponding nesting values, wherein each respective corresponding nesting value is indicative of a number of conditions required to populate the respective placeholder;
populating the one or more placeholders associated with corresponding nesting values of zero with data from a master data store or data that is based on a user input to a prompt for the one or more placeholders associated with corresponding nesting values of zero;
prompting, via the graphical user interface, the user to respond to one or more conditional prompts for the one or more placeholders associated with a next lowest corresponding nesting value;
populating the one or more placeholders associated with the next lowest corresponding nesting value based on a user input to the one or more conditional prompts until all of the one or more placeholders associated with the next lowest corresponding nesting value are populated; and
generating the electronic document based on the one or more placeholders as populated via the electronic document generation template for display on the graphical user interface.

12. The computer-implemented method of claim 11, further comprising:
prompting the user to select a collaboration group via the graphical user interface, wherein the collaboration group comprises a role assigned to each user within the collaboration group.

13. The computer-implemented method of claim 11, further comprising:
displaying a predicted number of prompts remaining via the graphical user interface based on the one or more placeholders with a highest nesting value and the user input.

14. The computer-implemented method of claim 11, further comprising:
automatically responding to one or more prompts to generate the electronic document based on a detected user location, wherein the one or more prompts comprise at least one of (i) the prompt or (ii) the one or more conditional prompts.

15. The computer-implemented method of claim 11, further comprising:
identifying one or more suggestions to respond to one or more prompts through an artificial intelligence model, wherein the one or more prompts comprise (i) the prompt or (ii) the one or more conditional prompts.

16. The computer-implemented method of claim 15, further comprising:
prompting the user with an auto-populate suggestion to respond to the one or more prompts via the graphical user interface based on the one or more suggestions identified by the artificial intelligence model.

17. The computer-implemented method of claim 15, further comprising:
prompting the user with a recommended collaboration group via the graphical user interface based on the one or more suggestions identified by the artificial intelligence model.

18. The computer-implemented method of claim 15, further comprising:
displaying a predicted number of prompts remaining via the graphical user interface based on an average number of remaining prompts identified by the artificial intelligence model.

19. A computer-implemented method for generating an electronic document, the computer-implemented method comprising:
accessing an electronic document generation template to generate an electronic document via a graphical user interface, wherein the electronic document generation template comprises one or more placeholders associated with respective corresponding nesting values, wherein each respective corresponding nesting value is indicative of a number of conditions required to populate the respective placeholder;
populating the one or more placeholders associated with corresponding nesting values of zero with data from a master data store or data that is based on a user input to a prompt for the one or more placeholders associated with corresponding nesting values of zero;
prompting the user to select a collaboration group via the graphical user interface, wherein the collaboration group comprises one or more roles assigned to each user within the collaboration group such that the user is assigned a role of the one or more roles;
displaying a predicted number of prompts remaining via the graphical user interface based on the one or more placeholders with a highest nesting value and the user input;
prompting, via the graphical user interface, the user respond to one or more conditional prompts for the one or more placeholders associated with a next lowest corresponding nesting value, wherein the prompt or a conditional prompt of the one or more conditional prompts may be based on the role assigned to the user within the collaboration group;
displaying an update to the predicted number of prompts remaining via the graphical user interface based on the one or more placeholders with the highest nesting value and the user input;
populating the one or more placeholders associated with the next lowest corresponding nesting value based on a user input to the one or more conditional prompts until all of the one or more placeholders associated with the next lowest corresponding nesting value are populated; and generating the electronic document based on the one or more placeholders as populated via the electronic document generation template for display on the graphical user interface.

20. The computer-implemented method of claim 19, further comprising:

identifying one or more suggestions to respond to one or more prompts through an artificial intelligence model, wherein the one or more prompts comprise at least one of (i) the prompt or (ii) the one or more conditional prompts; and prompting the user with an auto-populate suggestion to respond to the one or more prompts via the graphical user interface based on the one or more suggestions identified by the artificial intelligence model.

\* \* \* \* \*